UNITED STATES PATENT OFFICE.

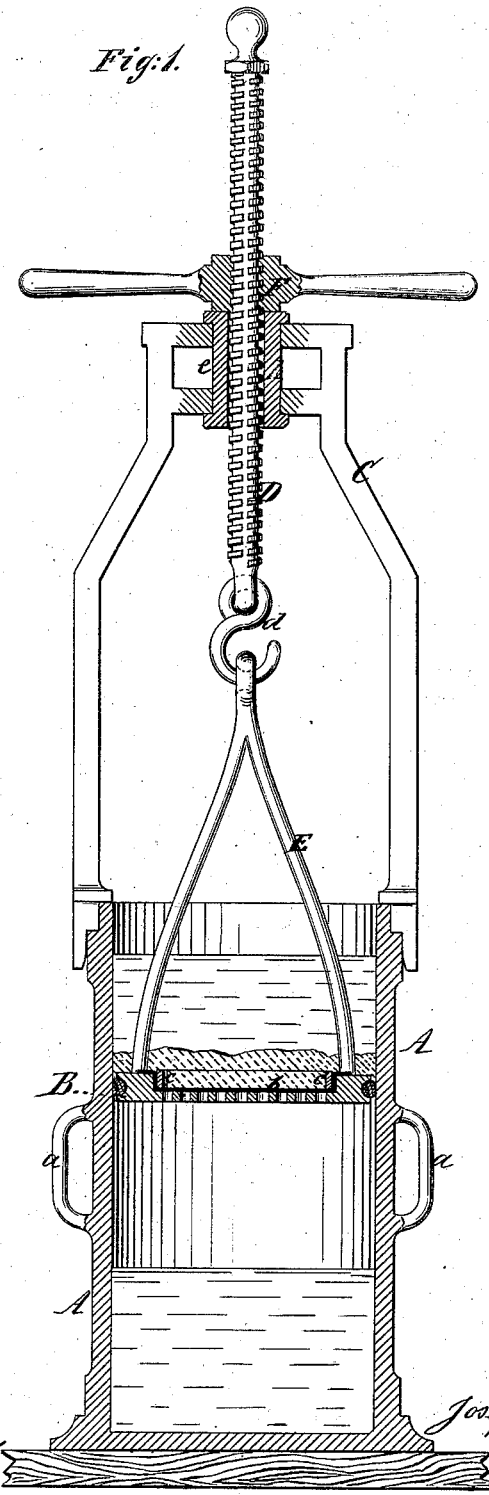

JOSEF MAYERHOFER, OF KAHLENBERGERDORF, NEAR VIENNA, AUSTRIA, ASSIGNOR TO LOUIS FLEISCHMANN, OF NEW YORK, N. Y.

IMPROVEMENT IN APPARATUS FOR PREPARING COFFEE.

Specification forming part of Letters Patent No. 194,702, dated August 28, 1877; application filed July 24, 1877.

*To all whom it may concern:*

Be it known that I, JOSEF MAYERHOFER, of Kahlenbergerdorf, near Vienna, in the Empire of Austria, have invented a new and useful Improvement in Apparatus for Preparing Coffee, which improvement is fully set forth in the following specification and accompanying drawing, which represents a vertical section through the apparatus.

This improvement in apparatus for preparing coffee by simple percolation of hot water consists in the combination of a cylinder, a perforated piston, and a frame containing the apparatus for operating the piston, the construction and operation of which parts will be fully hereinafter set forth.

In the drawing, the letter A designates the cylinder, which is open at the top and closed at the bottom. It is by preference made of cast metal, and provided with handles a a. B is a perforated piston, fitting into the cylinder A, with suitable packing. The central part of the piston has a cylindrical depression for the reception of a piece of flannel, b, or other suitable filtering material, which is stretched over the holes in the bottom of the depression, and secured by means of a ring, c, against the sides of the depression. To the top of the piston the bail E is attached, which has an eye at the upper end. A hook, d, at the lower end of screw-shank D, engages into the eye of the bail E. The screw-shank has only vertical motion, and is prevented from turning by a key, placed partly into the bushing e and partly in a groove cut through the thread of the screw. The bushing e is secured in a frame, C, which is placed on the top of the cylinder.

A screw-nut, F, with two handles, or with a hand-wheel, gives vertical motion to the shank D and to the piston.

The operation of the apparatus is as follows: The piston is first inserted into the cylinder, and pushed down to the bottom of the same. The ground coffee is then evenly spread on top of the piston, and the required quantity of water poured over it. After the frame has been placed in its position and the hook attached to the eye, the handle of the nut is turned so as to raise the piston. This will cause the formation of a partial vacuum beneath the piston, and will greatly accelerate the percolation of the coffee.

The quality of the product also will be superior, as by this rapid filtration and the draft to the inside of the cylinder, the loss in aroma is reduced to a minimum.

After the coffee is done the piston and frame are taken off, and an air-tight cover placed over the top of the cylinder.

I am aware that in coffee-machines perforated trays have been placed into vessels of different forms for receiving the ground coffee; but they are all stationary during the percolation, and do not act as pistons.

Having thus described my invention, what I claim as new, and desire to secure by Letters Patent, is—

In an apparatus for preparing coffee, the combination of the cylinder A, perforated piston B, and frame C, containing the apparatus for operating the piston, substantially as and for the purpose described.

In testimony that I claim the foregoing I have hereunto set my hand and seal this 22d day of May, 1877.

JOSEF MAYERHOFER. [L. S.]

Witnesses:
 FR. MORITZ HERMANN,
 WILLIAM HINING.